United States Patent [19]
Tremblay

[11] Patent Number: 5,457,562
[45] Date of Patent: Oct. 10, 1995

[54] NARROWCAST OPTICAL COMMUNICATION NETWORKS AND METHODS

[75] Inventor: Gerard Tremblay, Fremont, Calif.

[73] Assignee: Ericsson Raynet Corporation, Menlo Park, Calif.

[21] Appl. No.: 246,863

[22] Filed: May 20, 1994

[51] Int. Cl.⁶ .......................... H04B 10/04; H04B 10/00
[52] U.S. Cl. .......................... 359/188; 359/134; 359/160; 359/341; 372/6
[58] Field of Search ............................ 359/125, 132–134, 359/160, 167, 173, 188, 341; 372/6

[56] References Cited

U.S. PATENT DOCUMENTS 5,204,767  4/1993  Nakata et al. .......................... 359/125
5,331,449  7/1994  Huber et al. .......................... 359/125

Primary Examiner—David K. Moore
Assistant Examiner—Kinfe-Michael Negash
Attorney, Agent, or Firm—Lyon & Lyon

[57] ABSTRACT

Alternative methods and apparatus for introducing narrowcast transmission signals into a fiber optic broadcast network utilizing rare-earth-doped fiber amplifier technology are disclosed. The methods and apparatus include utilizing an existing 1480 nm pumping laser in an erbium-doped fiber amplifier to transmit a narrowcast signal into a 1550 nm broadcast transport fiber. The 1480 nm narrowcast signal is split off from the amplified 1550 nm broadcast signal(s) in order to bypass a 1550 nm optical isolator located at the output of the amplifier and then recombined with the broadcast signal(s) after the isolator.

11 Claims, 4 Drawing Sheets

NARROWCAST OPTICAL COMMUNICATION NETWORKS AND METHODS

BACKGROUND OF THE INVENTION

1. Field of the Invention

The present invention pertains to the field of optical communication networks. More particularly, the present invention pertains to methods and apparatus for introducing narrowcast transmission signals into a fiber optic broadcast network.

2. Prior Art Systems and Methods

Communication networks exist in a wide variety of types and sizes and are used for a wide variety of applications. Increasing use of fiber optic transport technology is being made for relatively large communication networks, such as telecommunications distribution networks.

Fiber optic communication systems, such as those currently used in telecommunications distribution networks, typically require amplification of the signal light to compensate for optical power (Db) loses which occur as the signal light travels over long distances, for example over 20 km. This amplification also serves to compensate for losses due to splitting the signal light between different branches of the network. In the past, electronic regeneration, which required photoelectric conversion, was used. More modern systems, however, employ optical amplification systems to amplify the signal light without requiring photoelectric conversion.

Modern fiber optic communication systems utilize optical amplification systems having an optical fiber whose core is doped with a rare-earth, such as erbium (Er). Rare-earth-doped fiber amplification systems, such as known erbium-doped fiber amplifier ("EDFA") systems, are well known in the art. In particular, EDFA technology offers high power gain and operational efficiency in the 1550 nm transmission wavelength band, which nominally covers a range of actual wavelengths from approximately 1530 nm to approximately 1560 nm. Since the lowest transmission power loss wavelength for optical fibers is in this 1550 nm range, rare-earth-doped fiber amplification systems, such as EDFA systems, which provide high power gain and operational efficiency in this bandwidth, are desirable for use in fiber optic communication systems. EDFA technology is also advantageous in that it is transparent to the transmission format of the signal light.

Typical EDFA systems amplify a signal light by passing the signal light through an erbium-doped optical fiber while simultaneously "pumping" the erbium-doped fiber with a relatively powerful light having a wavelength approximately equal to the absorption wavelength of erbium ions. In certain applications, it has been found advantageous to provide the pumping light in both the "forward" direction, (i.e., propagating in the same direction the signal light is traveling), and the "backward" direction, (i.e., propagating opposite to the direction that the signal light is traveling), although in other applications it has been found that is only necessary to provide the pumping light in one direction. The amount of amplification to the signal light generated by the EDFA is a function of, among other things, the physical length of the erbium-doped fiber (typically between 5 to 20 m), the wavelength of the pumping signal light(s) and the pump source power (generally greater than 50 mW). While the wavelength of the pumping light(s) for erbium-doped fiber amplifiers may be in the 500 nm, 600 nm, 800 nm, 980 nm, or 1480 nm bands, only the 1480 nm and 980 nm bands are generally used as they provide the most optimal power gain (up to 40 mW) to the signal light.

In a first exemplary known EDFA configuration, inserted in an "in-line" configuration along an incoming transport fiber carrying one or more 1550 nm band optical signals to be amplified, a fiber containing the output light from a 1480 nm forward pumping source is coupled with the transport fiber to the input end of an erbium-doped "gain fiber" by a wave division multiplexer (WDM), which directs both light sources into the gain fiber. The WDM may be an E-Tek dynamics model SWDM-1415-A, or a Gould Electronics model 1480-1550-COW-MX-02X02-01, or the like. A fiber containing the output light from a 980 nm backward pumping source is coupled to the output end of the gain fiber by a second WDM, which directs the 980 nm pumping light into the gain fiber propagating in the opposite direction than the 1480 nm pumping light, and also directs the amplified 1550 nm band signal(s) back into the transport fiber. An 1550 nm band optical isolator, such as a Gould Electronics OPT15015 or the like, is inserted across the transport fiber, after the second WDM, to prevent back reflections emanating from the "downstream" direction in the optical network from passing into the gain fiber, which may adversely affect the operation of the EDFA. The optical isolator also acts to effectively remove "power leakage" representing an "unused" portion of the 1480 nm pumping light, i.e., a portion of the 1480 nm light that is not absorbed by the erbium ions in the gain fiber, which exits the gain fiber along with the amplified 1550 nm band signal(s) and, via the second WDM, propagates into the transport fiber. Because only lightwave bandwidths of approximately 1200 nm to 1600 nm will propagate in typical optical networks, (which is a function of the core diameter of the transmission fiber, as well as signal transmission and reception limitations, respectfully, of the transmission equipment at either end), isolation of any reflected portion of the backward pumped 980 nm lightwave is not generally necessary.

In a second exemplary known EDFA configuration, identical to the first except that a 980 nm light is used for forward pumping and a 1480 nm light is used for backward pumping in the gain fiber, any power leakage in the form of reflected backward pumped 1480 nm light will be removed by the 1550 nm band optical isolator.

It is known to use a 1550 nm band wavelength based "global" optical communication network utilizing rare-earth-doped fiber amplifier technology, such as EDFAs, for transmitting one or more "broadcast" communication signals to a large plurality of end users or "subscribers," where long transmission distances, large subscriber bases and frequent optical splitting necessitate repeated optical signal regeneration in the form of cascaded amplifiers throughout branches of the network. As used herein, a "broadcast" signal refers to any communication signal, preferably in the RF range, i.e., at least 1 Mhz, which is intended to reach all subscribers connected to the communication network. A broadcast signal may contain, by way of example, telecommunications voice or data information, video signals, or the like. For instance, in a cable television transmission network, certain television signals are typically "broadcast" to all subscribers connected to the network.

It is also known to transmit one or more communication signals over smaller, "local" communication networks which generally have few or no amplifiers and have relatively few subscribers compared with the global networks previously discussed. Many optical networks, such as 1300 nm band wavelength based video transport networks, cannot utilize EDFA technology, since the EDFAs will effectively amplify optical signals only in the 1550 nm band; i.e., from approximately 1530 nm to approximately 1560 nm.

Because of the inherent advantage in performing the greatest possible number of transmission applications over a single optical communication network, it is desirable to be able to use global optical broadcast networks, such as a new or existing fiber optic telecommunications distribution network, to transport particular local signals, referred to herein as "narrowcast" signals, over limited portions of the global network. As used herein, a "narrowcast" signal may be identical to a "broadcast" signal in form or content, but is intended to be transmitted over only a limited portion of the global network; i.e., it is a signal that is selectively "narrowcast" to only some of the subscribers of the global network. For instance, a "video on demand" service in a major metropolitan area may wish to offer a limited number of local subscribers of a global telecommunications network that spans an entire metropolitan area the opportunity to view one of several hundred movies via a "narrowcast" transmission from the business location to each of the subscribers over the global telecommunications network. Other common examples of narrowcasting applications, although not an exhaustive sample, include business advertisements directed only to a limited group of local subscribers of a particular global broadcast network, or internal communications signals (e.g., for monitoring and maintenance purposes) sent between different "intelligent" components of a global telecommunications network.

Therefore, it is desirable to be able to transmit narrowcast signals in a 1550 nm band optical broadcast network, including those utilizing rare-earth-doped fiber amplifier technology, such as EDFA technology. Present global fiber optic communications networks do not adequately address the problems associated with a single optical network transmitting both "broadcast" and "narrowcast" signals.

SUMMARY OF THE INVENTION

The present invention overcomes the disadvantages of the prior art by allowing narrowcast signals to be advantageously transmitted over portions of new or existing global optical networks previously used only for broadcast signals. This is accomplished by introducing one or more narrowcast signals at selected points in the network and at varying signal power, depending upon the selected transmission wavelength of the particular narrowcast signal and the number of subscribers (or other recipients) the narrowcast signal is intended to reach.

For instance, in a first preferred embodiment, a 1300 nm wavelength narrowcast signal is employed in a 1550 nm band broadcast network utilizing EDFA technology. A 1300 nm optical transmission source, preferably a laser, is used to transmit the narrowcast signal light into a fiber which is injected into the 1550 nm band transport fiber of the broadcast network. In preferred embodiments, the narrowcast signal light is injected into the transport fiber at a splice point located after a given EDFA location, so that the 1300 nm signal is not removed by the 1550 nm band optical isolator at the output end of the EDFA's gain fiber. In preferred embodiments, an existing 1300 nm laser presently used to transmit the narrowcast signal over a 1300 nm based video network may be used to transmit the narrowcast signal over the 1550 nm based optical broadcast network, preferably from the same location. Such an arrangement would facilitate movement of the narrowcast signal transmission from a local 1300 nm based network to a global 1550 nm based network.

In preferred embodiments, the output signal light from a 1300 nm narrowcast laser is coupled with the network transport fiber after the "final" EDFA of a particular network branch; i.e., at a point where no further optical amplifiers are located between the narrowcast signal splice point and the remaining subscribers along that network path. If a 1300 nm narrowcast signal is coupled with the network transport fiber at a point where further downstream amplification of the 1550 nm broadcast signal(s) is required, or becomes required because of future network growth, the 1300 nm signal is split off from the transport fiber, (e.g., with a wave division multiplexer), prior to where it passes through the 1550 nm band optical isolator associated with the amplifier.

In another preferred embodiment, a 1550 nm wavelength narrowcast signal is employed in a 1550 nm band broadcast network utilizing EDFA technology. A 1550 nm optical source, preferably a laser, is used to transmit the narrowcast signal light into a fiber which is coupled with a broadcast network transport fiber carrying one or more 1550 nm band broadcast signals. In preferred embodiments, the narrowcast signal light is injected into the transport fiber at a splice point located just prior to an EDFA location. In this manner, the optical transmission source of the 1550 nm narrowcast signal can be operated advantageously at very low output power, since the output signal will be immediately fully amplified in the EDFA along with the broadcast signal(s).

Where both broadcast and narrowcast signals are being transmitted within the 1550 nm "nominal bandwidth" range, (i.e., 1530 nm to 1560 nm), the division of bandwidth allocated between the broadcast and narrowcast signals, respectively, is a function of the applications performed by the particular network. By way of example, in a preferred embodiment of an optical network that transmits a 2:1 narrowcast to broadcast signal ratio, wavelengths above 1550 nm, (i.e., 1550 nm to 1560 nm), are reserved for broadcast signals and wavelengths below 1550 nm, (i.e., 1530 nm to 1550 nm), are reserved for narrowcast signals.

In another preferred embodiment, a 1480 nm wavelength narrowcast signal is employed in a 1550 nm band broadcast network utilizing EDFA technology, wherein the 1480 nm pumping source, preferably a laser, of an EDFA located in the broadcast network is used to transmit the narrowcast signal. By utilizing the EDFA's 1480 nm pumping source to transmit the narrowcast signal, no additional optical transmission source is required, providing significant initial deployment and ongoing operation and maintenance savings.

By way of example, in a preferred embodiment, a unique EDFA configuration comprises a 1480 nm forward pumping laser, which is modulated to transmit a narrowcast signal light, and a 980 nm backward pumping laser producing a continuous output light. A portion of the 1480 nm narrowcast signal light is not absorbed by the erbium ions in the gain fiber and propagates out of the gain fiber, along with the amplified 1550 nm broadcast signal(s), into the transport fiber. The 1480 nm narrowcast signal is split off from the 1550 nm broadcast signal(s) with a WDM located prior to when the transport fiber passes through the 1550 nm band optical isolator. The 1480 nm narrowcast signal is then recombined with the 1550 nm broadcast signal(s) on the transport fiber with a second WDM located after the optical isolator. By locating the optical isolator between the two WDMs, the 1480 nm narrowcast signal is not removed by the 1550 nm band optical isolator. To control the transmission power of the 1480 nm narrowcast signal at the output of the EDFA, the 1480 nm narrowcast signal is preferably passed through an attenuator device, such as a Gould Electronics 1550-COX-03-01 or the like, which is inserted between the two WDM splitters along the path of the 1480 nm narrowcast signal.

While a 1480 nm pumping laser of an EDFA is normally operated in a continuous output mode, in order to generate and transmit the narrowcast signal, its output is modulated. To prevent adverse impact on the performance of the EDFA, the frequency of the modulated 1480 nm narrowcast signal is kept high. Preferably, the frequency of the applied 1480 nm modulated narrowcast signal should exceed 1 Khz to minimize loss in the EDFA output gain. In practice, it is presently preferred that the narrowcast signal be transmitted in the RF range, e.g., at least at 1 Mhz.

In an alternate preferred embodiment, a unique EDFA configuration is provided with a 1480 nm laser, as either the forward or backward pumping source, which is used to transmit the narrowcast signal. A portion of the output light signal from the 1480 nm laser is diverted with an optical splitter prior to when the light signal enters the gain fiber. The diverted portion of the 1480 nm signal is then coupled with the 1550 nm broadcast signal(s) beyond the optical isolator. A relatively high output power for the 1480 nm laser (preferably greater than 50 Mw) is preferably employed. Thus, only a small portion of the signal light is required to be split off prior to the gain fiber in order to meet the downstream narrowcast signal transmission requirements and the majority of the 1480 nm laser light remains available for pumping in the gain fiber. In this unique arrangement, the power of the 1480 nm narrowcast signal at the EDFA output will be a function of the selected optical splitter ratio.

Accordingly, it is an object of the present invention to provide methods for transmitting narrowcast signals at a variety of selected wavelengths in a 1550 nm band fiber optic broadcast network utilizing rare-earth-doped amplifier technology. As will be apparent to those skilled in the art, other and further objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings illustrate both the design and utility of preferred embodiments of the present invention, in which.

DETAILED DESCRIPTION OF THE PREFERRED EMBODIMENTS

Figure 1:
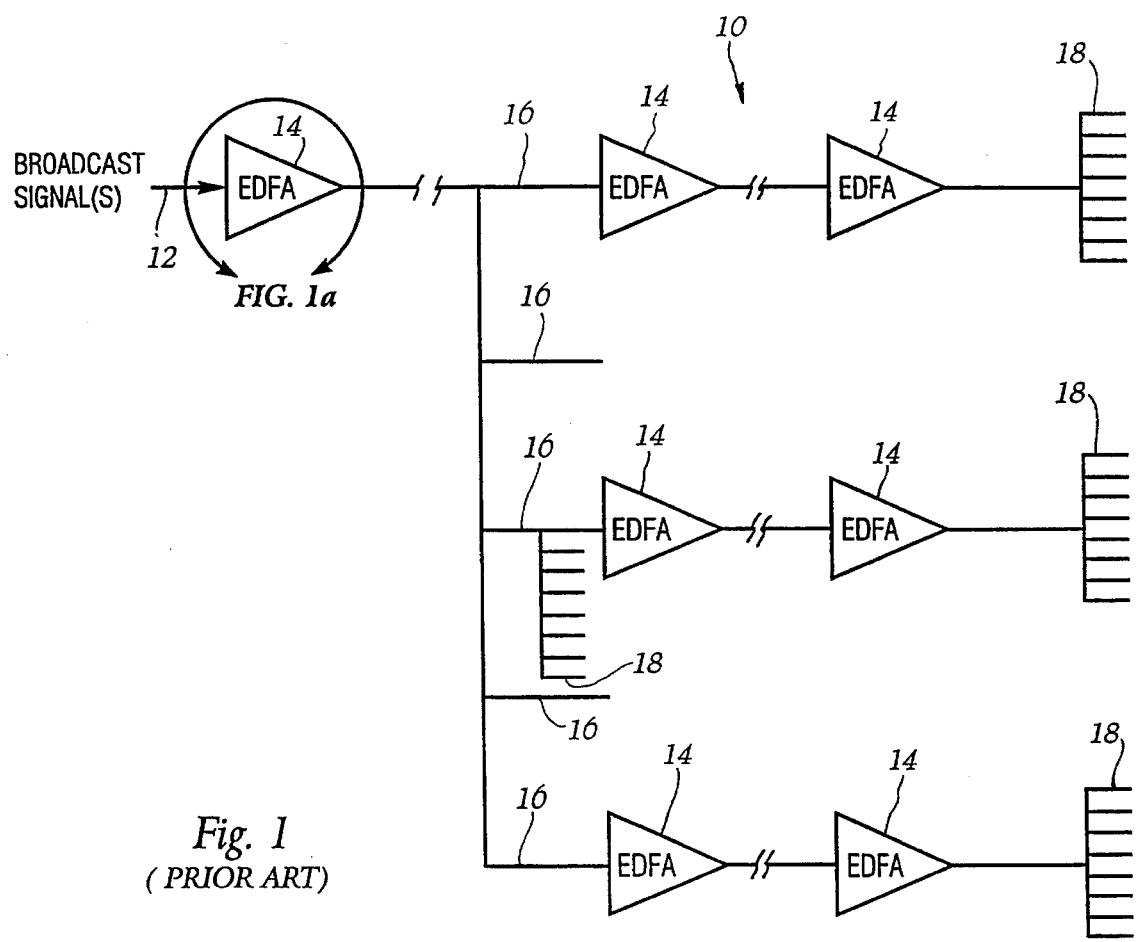
FIG. 1 is a block diagram of a prior art 1550 nm band fiber optic broadcast communication network utilizing EDFA technology.

FIG. 1 depicts a block diagram of a preferred embodiment of a fiber optic broadcast network 10. The network 10 transmits one or more 1550 nm band broadcast signals along an optical fiber 12 from an initial broadcast location (not shown) to a plurality of network subscribers 18 over a plurality of network branches 16. The optical fiber 12 is preferably capable of transporting signals with wavelengths in the range of 1200 nm to 1600 nm. The 1550 nm broadcast signal(s) are shown passing through a series of cascading erbium-doped fiber amplifiers ("EDFAs") 14, which are placed in-line, at predetermined intervals, along the network branches 16. The EDFAs 14 amplify lightwave signals with wavelengths from approximately 1530 nm to approximately 1560 nm. Each network subscriber may represent one of any number of optical/electrical terminals (not shown), such as those needed for converting the signal(s) for telephone, television, personal computer, or other interface applications.

In a preferred network design, each EDFA 14 is inserted in-line along optical fiber 12 at a point where the power of the 1550 nm band broadcast signal(s) has dropped to no lower than 1 Mw. Each EDFA 14 outputs optical signals having power as high as 40 mW. The particular placement location of each EDFA 14 in network 10 is determined by, among other things, the length of transport fiber 12 over which each of the one or more broadcast signals has travelled, and the power losses incurred by splitting the broadcast signal(s) into the different network branches 16 or to subscribers 18, prior to where the signal(s) reach the EDFA.

Figure 1A:
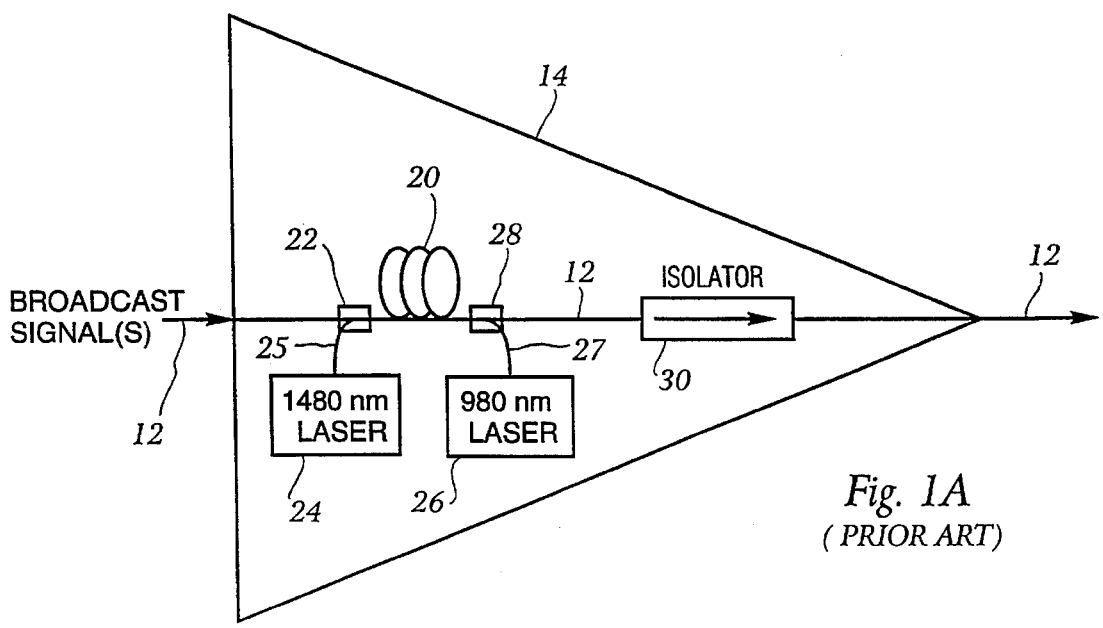
FIG. 1a is a block diagram of a prior art fiber amplifier, typical of one used in a 1550 nm band fiber optic broadcast communication network.

FIG. 1a depicts a block diagram of a preferred configuration of an EDFA 14 used in network 10. The transport fiber 12 is coupled with an input end of an erbium-doped gain fiber 20 by a first wave-division multiplexer (WDM) 22. Also coupled to the input end of gain fiber 20, via WDM 22, is an optical fiber 25 carrying the output signal light of a 1480 nm wavelength forward pumping laser 24. Laser 24 pumps a continuous 1480 nm band lightwave through fiber 25 and into gain fiber 20, wherein the 1480 nm light propagates in the same direction as the 1550 nm band broadcast signal(s) carried on transport fiber 12. A 980 nm wavelength backward pumping laser 26 pumps a continuous 980 nm wavelength band light into a fiber 27 which is coupled to an output end of gain fiber 20 by a second WDM 28, wherein the 980 nm light propagates into the gain fiber in the opposite direction as the 1480 nm pumping light and 1550 nm band broadcast signal(s) propagate. The transmission power of the 1550 nm band broadcast signal(s) is boosted as the signal(s) pass through gain fiber 20.

WDM 28 directs the amplified 1550 nm band broadcast signal(s) back into transmission fiber 12 from the output end of gain fiber 20. The 1550 nm band broadcast signal(s) are then passed through an optical isolator 30, which prevents back reflections emanating from downstream of EDFA 14 on transport fiber 12 from entering gain fiber 20. The optical isolator 30 also acts to attenuate or remove "power leakage" in the form of a portion of the 1480 nm forward pumping light that is not absorbed by the erbium ions and exits gain fiber 20, along with the 1550 nm broadcast signal(s), through WDM 28, and into transport fiber 12.

Figure 2:
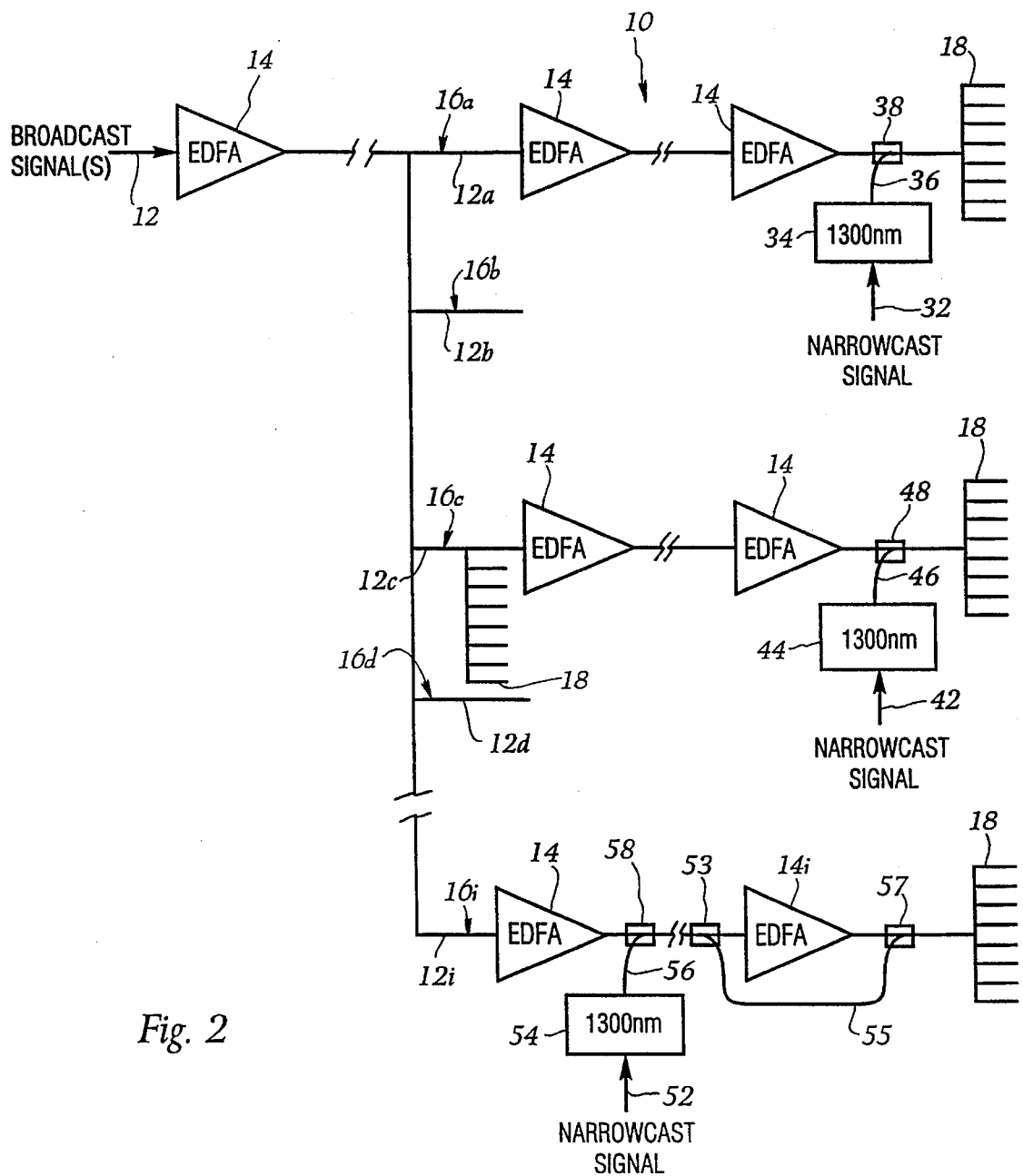
FIG. 2 is a block diagram of a 1550 nm band fiber optic broadcast communication network utilizing EDFA technology wherein a plurality of narrowcast signals transmitted at a 1300 nm wavelength are injected into the network at various respective points along network branches.

Referring to FIG. 2, there is shown a block diagram of a preferred embodiment of the fiber optic broadcast network 10 employing a plurality of narrowcast signals 32, 42 and 52, respectively, each transmitted at a wavelength of approximately 1300 nm. The source (not shown) of narrowcast signals 32, 42 and 52, respectively, may include, by way of example only, private data transport signals between subscribers of network 10, local telephone network monitoring signals between computerized components of network 10, commercial video transmission signals moved from a 1300 nm band video system onto network 10, or one of any number of other possible narrowcast applications suitable for transmission at a 1300 nm wavelength.

Narrowcast signal 32 is optically transmitted by a 1300 nm band optical transmission source 34, preferably a laser. A fiber 36 carrying the output signal from optical transmission source 34 is coupled with transport fiber 12a of network branch 16a by a WDM 38. WDM 38 is located at a predetermined splice point beyond the final cascaded EDFA 14 of network branch 16a. Narrowcast signal 42 is injected into network branch 16c in a similar fashion as narrowcast signal 32 is injected into network branch 16a. Narrowcast signal 42 is optically transmitted by a 1300 nm band optical transmission source 44, also preferably a laser. A fiber 46 carrying the output signal from optical transmission source 44 is coupled with transport fiber 12c of network branch 16c by a WDM 48. WDM 48 is located at a predetermined splice point beyond the final cascaded EDFA 14 of network branch 16c.

Narrowcast signal 52 is injected into network branch 16i in a similar fashion as signals 32 and 42 are injected into network branches 16a and 16c, respectively, except that signal 52 is injected at a point along branch 16i where downstream amplification of the 1550 nm band broadcast signal(s) is encountered. Specifically, narrowcast signal 52 is optically transmitted by a 1300 nm band optical transmission source 54, also preferably a laser. A fiber 56 carrying the output signal from optical transmission source 54 is coupled with transport fiber 12i of network branch 16i by a WDM 58. WDM 58 is located at a predetermined splice point before at least one cascaded EDFA 14i of network branch 16i. In order to prevent narrowcast signal 52 from being eliminated by the optical isolator of EDFA 14i, narrowcast signal 52 is split off from network branch 16i by a WDM 53, transported around EDFA 14i on a fiber 55, then injected back into branch 16i with a second WDM 57 located just beyond the optical isolator of EDFA 14i.

Figure 3:
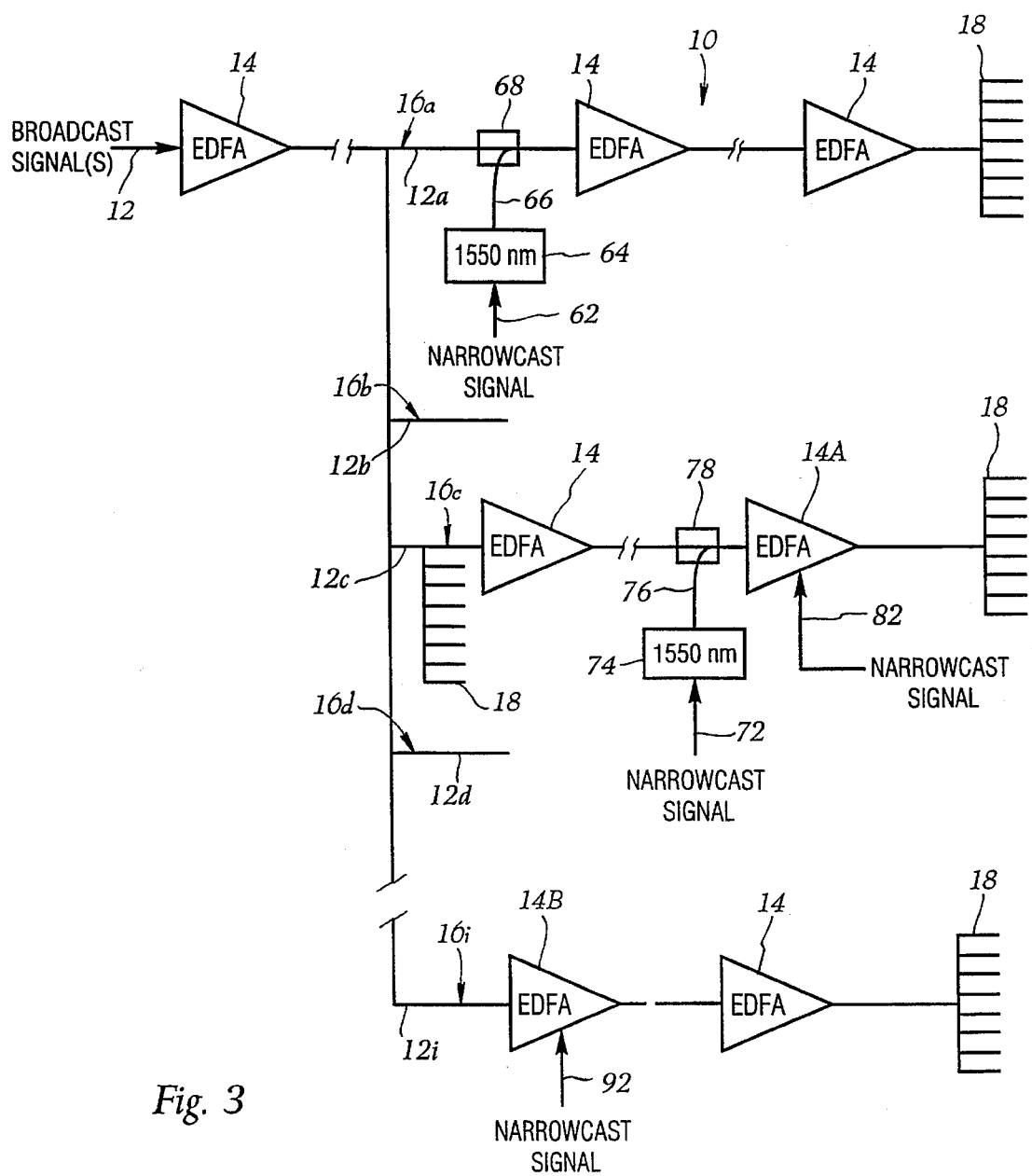
FIG. 3 is a block diagram of a 1550 nm band fiber optic broadcast communication network utilizing EDFA technology wherein a plurality of narrowcast signals transmitted at a 1550 nm wavelength are injected into the network at various respective points along network branches.

Referring to FIG. 3, there is shown a block diagram of a preferred embodiment of the fiber optic broadcast network 10 employing a plurality of narrowcast signals 62 and 72, respectively, transmitted at a wavelength of approximately 1550 nm, and narrowcast signals 82 and 92, respectively, transmitted at a wavelength of approximately 1480 nm. The source (not shown) of narrowcast signals 62, 72, 82 and 92, respectively, may be similar to the source of the 1300 nm narrowcast application examples recited in accordance with the above discussion of FIG. 2, as well as any number of further possible narrowcast applications suitable for transmission at the 1550 nm or 1480 nm wavelengths, respectively.

Narrowcast signal 62 is optically transmitted by a 1550 nm band optical transmission source 64, preferably a laser. A fiber 66 carrying the output signal from optical transmission source 64 is coupled with transport fiber 12a of network branch 16a by a WDM 68. In preferred embodiments, WDM 68 is located at a predetermined splice point in transport fiber 12a immediately prior an EDFA 14 location which directly services the subscribers to which narrowcast signal 62 is to be transported. Likewise, narrowcast signal 72 is optically transmitted by a 1550 nm band optical transmission source 74, also preferably a laser. A fiber 76 carrying the output signal from optical transmission source 74 is coupled with transport fiber 12c of network branch 16c by a WDM 78. In preferred embodiments, WDM 78 is located at a predetermined splice point in transport fiber 12c immediately prior an EDFA 14 location which directly services the subscribers to which narrowcast signal 72 is to be transported.

In preferred embodiments, narrowcast signals 62 and 72 are injected into transport fibers 12a and 12c, respectively, immediately prior to a particular EDFA 14 location so that each respective narrowcast signal will be fully amplified by the respective EDFA 14, thereby allowing optical transmission sources 64 and 74, respectively, to be operated advantageously at a very low output power, e.g., each at about 1 mW.

Where 1550 nm narrowcast signals are employed in a 1550 nm band broadcast network, the specific wavelengths allocated between the broadcast signals and the narrowcast signals is a function of the applications served by the particular network. For example, where the ratio of narrowcast applications to broadcast applications of a particular network is approximately 2:1, wavelengths between 1550 nm and 1560 nm may be reserved for broadcast signal transmission and wavelengths between 1530 nm and 1550 nm may be reserved for narrowcast signal transmission. Because wavelength differentiation between transport signal lights need only be approximately 0.1 nm, this particular allocation system would provide for a signal capacity of up to 200 narrowcast signals and up to 100 narrowcast signals.

Figure 4:
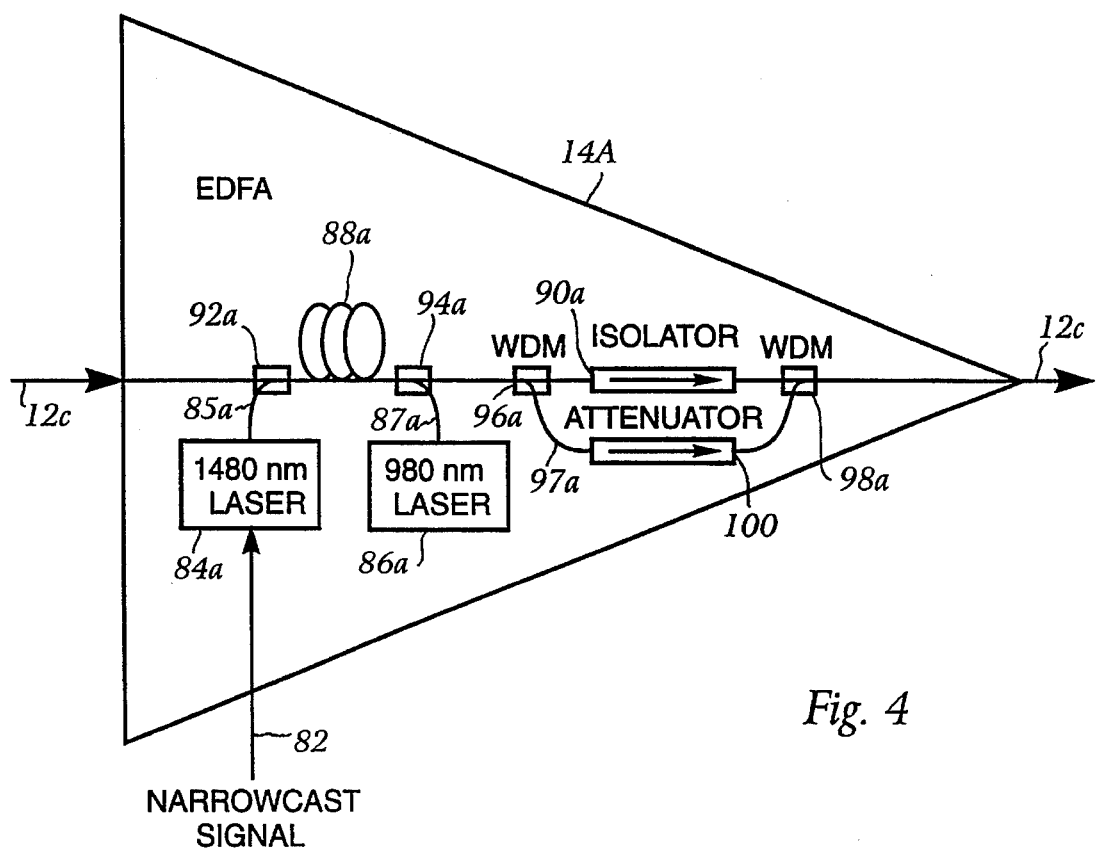
FIG. 4 is a block diagram of an amplifier according to one aspect of the present invention for use in fiber optic communication networks carrying both broadcast and narrowcast signals.

Referring to FIG. 4, there is shown a preferred EDFA configuration 14A which may be used in network 10 for introducing narrowcast signal 82 into transport fiber 12c. EDFA 14A comprises a 1480 nm forward pumping source 84a, preferably a laser, a 980 nm backward pumping source 86a, also preferably a laser, an erbium-doped 9a in fiber 88a and an optical isolator 90a. Narrowcast signal 82 is transmitted by the forward pumping source 84a into fiber 85a, which, along with transport fiber 12c, is coupled to an input end of 9a in fiber 88a by a WDM 92a. Backward pumping source 86a transmits a continuous 980 nm wavelength band light into a fiber 87a which is coupled to an output end of gain fiber 88a by a WDM 94a. WDM 94a also directs the fully amplified 1550 nm band broadcast signal(s) from the output end of the gain fiber back into transport fiber 12c.

It has been found that a 1480 nm laser is acceptable as the 1480 nm pumping source 84a for transmitting the narrowcast signal, as its relative intensity noise is low (about 152 dBm/Hz) due to its high bias point (at an output power higher than 50 mW), and the laser linearity is acceptable for digital signal transmission requirements (about 35 dB distortion). In order to transmit the narrowcast signal, the 1480 nm laser's output is modulated instead of continuous. So long as the frequency of the modulated 1480 nm narrowcast signal is sufficiently high, no adverse impact on the performance of the EDFA 14A will occur. Specifically, the transition time of the excited erbium ions is approximately 1 ms. Thus, in theory, if the frequency of the applied 1480 nm modulated narrowcast signal exceeds 1 kHz, no loss in EDFA 14A's output gain should occur. To ensure an adequate modulation rate, in practice, it is preferred that the narrowcast signal be transmitted in the RF range, i.e., at least at 1 MHz.

According to an aspect of the invention, the 1480 nm pumping source 84a is operated at a sufficiently high power level such that a portion of the 1480 nm narrowcast signal is not absorbed by the erbium ions in gain fiber 88a, and, instead, is transmitted along with the amplified 1550 nm broadcast signal(s), via WDM 94a, into transport fiber 12c at the output end of gain fiber 88a. The 1480 nm narrowcast signal is split off from the 1550 nm broadcast signal(s) by a WDM 96a into a fiber 97a, prior to when transport fiber 12c passes through 1550 nm optical isolator 90a. The 1480 nm narrowcast signal is reinjected into transport fiber 12c after isolator 90a by a WDM 98a, which couples fiber 97a to transport fiber 12c.

In order to adjust the transmission power of the 1480 nm narrowcast signal in transport fiber 12c at the output of EDFA 14A, the 1480 nm signal is preferably passed through an optical attenuator 100, which is preferably fixed and which is inserted in-line along fiber 97a between WDM splitters 96a and 98a, respectively.

Figure 5:
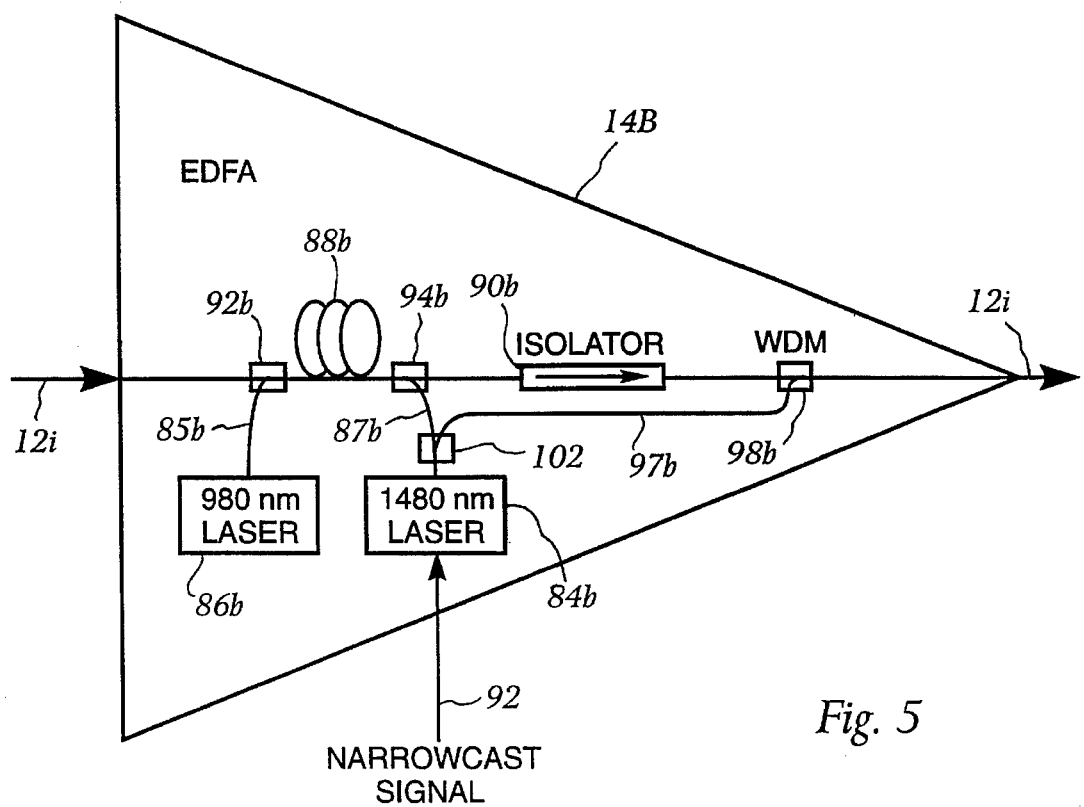
FIG. 5 is a block diagram of another amplifier according to one aspect of the present invention for use in fiber optic communication networks carrying both broadcast and narrowcast signals.

Referring to FIG. 5, there is shown a second preferred EDFA configuration 14B which may be used in network 10 for introducing narrowcast signal 92 into transport fiber 12i. EDFA 14B is supplied with a 980 nm forward pumping source 86b, preferably a laser, a 1480 nm backward pumping source 84b, also preferably a laser, an erbium-doped gain fiber 88b and an optical isolator 90b. In EDFA configuration 14B, narrowcast signal 92 is transmitted by the backward pumping source 84b into a fiber 87b. Fiber 87b is coupled to the output end of gain fiber 88b by a WDM 94b. An optical splitter 102 located on fiber 87b between WDM 94b and the output of pumping source 84b diverts a portion of narrowcast signal 92 from fiber 87b into a fiber 97b. Fiber 97b is coupled with transport fiber 12i by WDM 98b at a splice point located beyond the output of optical isolator 90b.

Because of the relatively high output power of pumping source 84b (preferably greater than 50 mW), only a small portion of the 1480 nm signal light is required to meet the downstream narrowcast signal transmission requirements and the majority of the light remains available for pumping gain fiber 88b. In preferred embodiments, the diversion of some of the 1480 nm light power from gain fiber 88b will not cause any noticeable decrease in the output gain of EDFA 14B. Further, EDFA pumping sources, which typically are lasers, are normally operated at less than full power and, if necessary, the output power of the pump can be increased to make up for the diversion of narrowcast signal 92 by optical splitter 102.

As can be seen, the transmission power of the 1480 nm narrowcast signal at the output of EDFA 14B, will be a function of the output power of the 1480 nm pumping source and the selected splitter ratio of optical splitter 102. For example, a 95:05 splitter ratio will divert 5% of the output signal light from fiber 87b into fiber 97b and the other 95% into gain fiber 88b. However, other arrangements are possible to achieve, if desired; (e.g., a 90:10 splitter may be used to increase the power of the narrowcast signal being transmitted).

Thus, various methods for transmitting narrowcast signals in a 1550 nm based fiber optic communication network utilizing EDFA repeater technology have been disclosed.

While embodiments and applications of this invention have been shown and described, it would be apparent to those skilled in the art that many more modifications and applications are possible without departing from the inventive concepts herein. For example, the methods and apparatus described herein for injecting a signal into an optical transport medium populated with EDFAs could be used for many applications, narrowcast signal transmission being only one of them. The injection of a system monitoring signal, or some other private or limited function signal, can also be accomplished with the aforementioned methods and apparatus.

The scope of the invention, therefore, is not to be restricted except in the spirit of the appended claims.

I claim:

1. A communication network, comprising:

a first optical fiber carrying a broadcast signal to a plurality of subscribers;

an erbium-doped fiber amplifier inserted in-line along said first optical fiber;

a second optical fiber carrying a narrowcast signal;

optical coupling means for connecting said first and second optical fibers and injecting said narrowcast signal into said first optical fiber, said coupling means located in-line along said first optical fiber at a location upstream from said amplifier; and means for diverting said narrowcast sipnal from said first optical fiber at a location upstream of said amplifier and returning said narrowcast sipnal back into said first optical fiber at a location downstream from said amplifier, said broadcast sipnal passing through said amplifier in said first optical fiber.

2. An optical communication network, comprising:

an optical transport fiber carrying a broadcast signal to a plurality of subscribers; and an optical amplifier, comprising
a rare-earth-doped gain fiber having an input end and an output end, said gain fiber inserted in-line along said transport fiber,
an optical pumping source, said pumping source transmitting a narrowcast signal, and means for injecting said narrowcast signal into said gain fiber.

3. The optical communication network of claim 2, said injecting means injecting said narrowcast signal into said input end of said gain fiber.

4. The optical communication network of claim 3, said optical amplifier further comprising:

an optical isolator inserted in-line on said transport fiber downstream from said gain fiber; and means for diverting said narrowcast signal from said transport fiber at a location upstream of said isolator and returning said narrowcast signal back into said transport fiber at a location downstream from said isolator, said broadcast signal passing through said isolator in said transport fiber.

5. The optical communication network of claim 2, said injecting means including means for injecting a portion of said narrowcast signal into said transport fiber at a location downstream from said gain fiber.

6. The optical communication network of claim 2, wherein said pumping source comprises a laser.

7. The optical communication network of claim 6, wherein said laser transmits said narrowcast signal at a wavelength of approximately 1480 nm.

8. The optical communication network of claim 2, wherein said pumping sources transmits said narrowcast signal at a frequency greater than 1 kHz.

9. The communication network of claim 2, wherein said gain fiber is an erbium-doped gain fiber.

10. An optical communication network, comprising:

a transport fiber carrying a plurality of 1550 nm wavelength broadcast signals to a plurality of subscribers; and an erbium-doped fiber amplifier, comprising
      a erbium-doped gain fiber having an input end and an output end, said gain fiber inserted in-line along said transport fiber, said plurality of broadcast signals passing through said gain fiber,
      an optical isolator inserted in-line along said transport fiber at a location downstream from said gain fiber, said plurality of broadcast signals passing through said isolator,
      a 1480 nm pumping laser, said laser transmitting a narrowcast signal,
      means for injecting a first portion of said narrowcast signal into said gain fiber, and
      means for injecting a second portion of said narrowcast signal into said transport fiber at a location downstream from said isolator.

11. The optical communication network of claim 10, further comprising means for passing said second portion of said narrowcast signal through an optical signal attenuator.

* * * * *